(12) United States Patent
Czeromin

(10) Patent No.: US 11,516,444 B2
(45) Date of Patent: Nov. 29, 2022

(54) SWITCHGEAR WITH A MODULAR OPTICAL MONITORING SYSTEM

(71) Applicant: SIEMENS AKTIENGESELLSCHAFT, Munich (DE)

(72) Inventor: Kay Czeromin, Buettelborn (DE)

(73) Assignee: Siemens Aktiengesellschaft, Munich (DE)

( * ) Notice: Subject to any disclaimer, the term of this patent is extended or adjusted under 35 U.S.C. 154(b) by 1 day.

(21) Appl. No.: 16/797,216

(22) Filed: Feb. 21, 2020

(65) Prior Publication Data

US 2020/0275064 A1 Aug. 27, 2020

(30) Foreign Application Priority Data

Feb. 21, 2019 (DE) .......................... 10201920236.2

(51) Int. Cl.
*H04N 7/22* (2006.01)
*G02B 6/06* (2006.01)
*H04N 5/225* (2006.01)

(52) U.S. Cl.
CPC ................. *H04N 7/22* (2013.01); *G02B 6/06* (2013.01); *H04N 5/2252* (2013.01); *H04N 2005/2255* (2013.01)

(58) Field of Classification Search
CPC ................. H04N 7/22; H04N 5/2252; H04N 2005/2255; G02B 6/06
USPC .......................................................... 348/82
See application file for complete search history.

(56) References Cited

U.S. PATENT DOCUMENTS

| 4,958,932 A * | 9/1990 | Kegelman ............ A61B 5/1076 356/636 |
| 10,341,540 B2 | 7/2019 | Huempfner |
| 2005/0200842 A1* | 9/2005 | Bonningue ........ G02B 23/2469 356/241.1 |
| 2006/0155168 A1 | 7/2006 | Pease |
| 2008/0105524 A1* | 5/2008 | Olszewski ........... H01H 1/0015 200/312 |
| 2011/0063428 A1* | 3/2011 | Sonnenschein ...... H04N 5/2254 348/76 |
| 2015/0296146 A1* | 10/2015 | Scanlon ................. H04N 5/247 348/82 |
| 2017/0296037 A1 | 10/2017 | Yoshino |

FOREIGN PATENT DOCUMENTS

| DE | 9312384 U1 | 10/1993 | |
| DE | 102015218645 B3 | 2/2017 | |
| EP | 0805535 A2 * | 11/1997 | ......... H02B 13/0354 |
| EP | 1184950 A1 | 3/2002 | |
| GB | 599421 A | 3/1948 | |
| WO | 2010037374 A1 | 4/2010 | |
| WO | 2017055018 A1 | 4/2017 | |

* cited by examiner

*Primary Examiner* — Joseph G Ustaris
*Assistant Examiner* — Matthew David Kim
(74) *Attorney, Agent, or Firm* — Laurence A. Greenberg; Werner H. Stemer; Ralph E. Locher

(57) ABSTRACT

A switchgear includes a modular optical monitoring system for examining switchgear switching positions and at least one isolating switch accommodated in an encapsulated housing. The encapsulated housing is disposed in an installation housing. The encapsulated housing has a first transparent window in one region and a fiber-optic system leads from an outer side of the installation housing to the first transparent window.

19 Claims, 3 Drawing Sheets

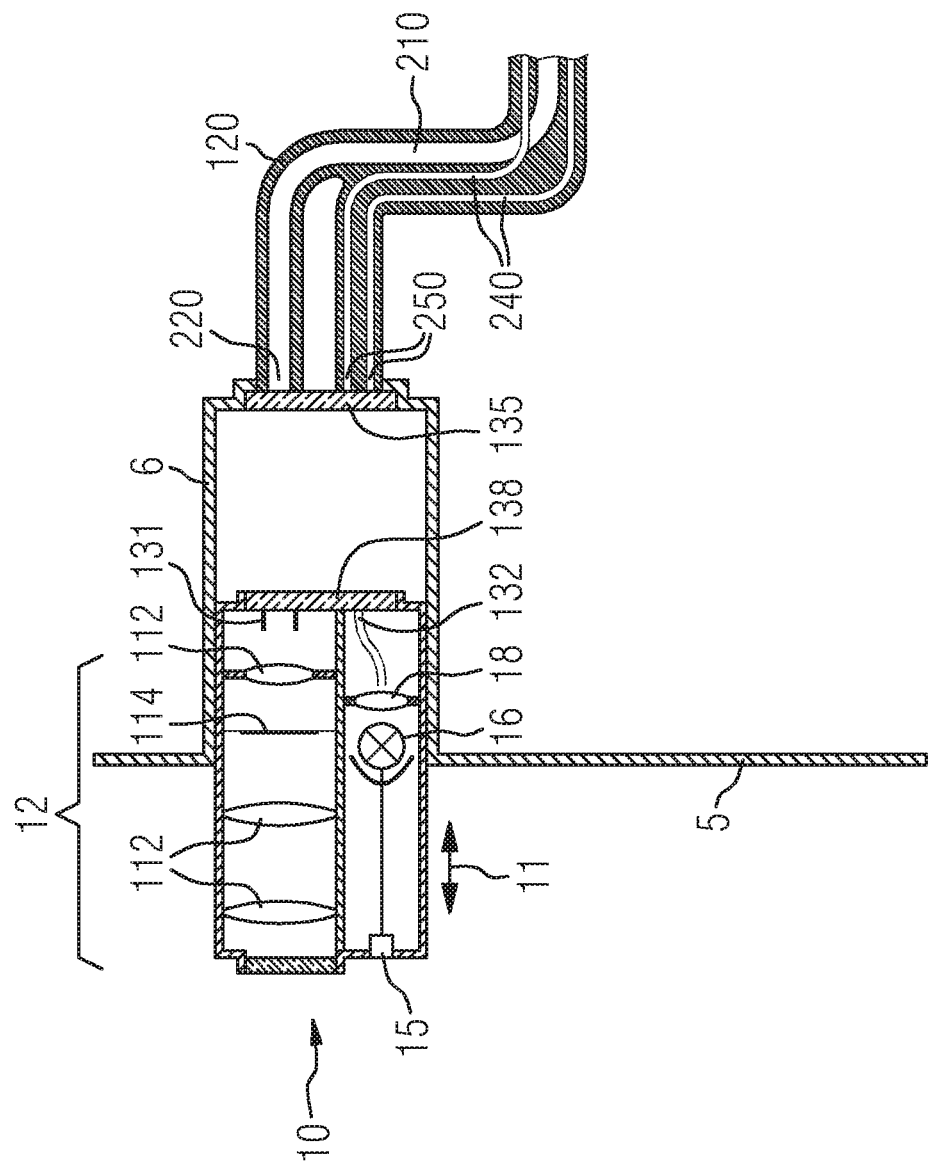

SWITCHGEAR WITH A MODULAR OPTICAL MONITORING SYSTEM

CROSS-REFERENCE TO RELATED APPLICATION

This application claims the priority, under 35 U.S.C. § 119, of German Patent Application DE 10 2019 202 362, filed Feb. 21, 2019; the prior application is herewith incorporated by reference in its entirety.

BACKGROUND OF THE INVENTION

Field of the Invention

The invention relates to a switchgear, in particular a gas-insulated switchgear, with a modular optical monitoring system.

Camera systems are often employed in the prior art for examining the switching position of an isolating switch or of a three-position switch.

A camera system for checking the switching position in a gas-insulated switchgear is known from German Patent Application DE 10 2015 218 645, corresponding to U.S. Pat. No. 10,341,540.

Camera systems have the disadvantages that they are potentially liable to malfunction, the systems are expensive and in the case of an electrical current failure they can only be operated with suitable reserve electrical supplies. A continuous electrical supply must, in particular, be present for such systems, and a computer, e.g. a mobile notebook, tablet, a permanently installed computer or another displaying system is also necessary.

SUMMARY OF THE INVENTION

It is accordingly an object of the invention to provide a switchgear with a modular optical monitoring system, which overcomes the hereinafore-mentioned disadvantages of the heretofore-known devices of this general type and which can be employed flexibly.

With the foregoing and other objects in view there is provided, in accordance with the invention, a switchgear with an optical monitoring system for examining switchgear switching positions, wherein:

the switchgear has at least one isolating switch,
the at least one isolating switch is accommodated in an encapsulated housing,
the encapsulated housing is disposed in an installation housing, and the encapsulated housing has a first transparent window in one region,
a fiber-optic system leads from an outer side of the installation housing to the first transparent window, the fiber-optic system includes at least one first fiber bundle with a first end and a second end that captures an optical picture of the at least one isolating switch through the first transparent window and transmits it to an observation module disposed at the first end with an imaging system at or in the installation housing, and fiber-optic system includes at least one second fiber bundle with a third end and a fourth end, and light of a light source can be guided from the third end to the fourth end in the region of the first transparent window and can be guided through the first transparent window, and the light source and the imaging system are disposed in the observation module, and the observation module is disposed removably at or in the installation housing.

For the purposes of the present disclosure, removable is intended to mean that the observation module can be removed from the installation housing after undoing an optional fastening, and that the same observation module, or another matching observation module, can again be inserted into the installation housing in such a way that the functionality of the monitoring system is or can be restored once more.

An optical monitoring system is thus provided wherein a direct observation of the isolating switch is possible by using a fiber-optic system. The system is thus, in principle, not dependent on a residual electrical supply of the switchgear, but an energy source that can be provided in the observation module, or an external energy source, can be used, for which an electrical interface can be provided at the observation module. In addition, an external light source can also be used such as, for example, a pocket lamp, ambient light, or ambient light collected at the third end of the second fiber bundle, for which an optical interface can be provided at the observation module. In addition to a mains connection, energy stores in particular, such as for example a battery, an accumulator and/or a capacitor are suitable as an energy source in the observation module or as an external energy source for the supply of electricity. In particular, a battery or accumulator in the operating unit is preferred.

The term isolating switch is to be understood in this case to refer both to an isolating switch as well as to a multi-position switch with an isolating function.

Fiber bundle is to be understood to refer to glass and/or plastic fibers guided together that are constructed to guide light in the interior of the individual fibers. A fiber bundle, in particular the second fiber bundle, can be formed of a single fiber or of a plurality of fibers, with the first fiber bundle preferably being formed of a plurality of fibers.

The transparent window is a window that is transparent at least in the visible spectrum of the light, and is made for example of glass, plastic or casting resin.

The use of separate fiber bundles enables a separate illumination and onward transmission of the view, i.e. of the picture or optical image, of the isolating switch or switches.

Picture, optical picture, image and optical image refer to an image of the object or objects that are to be observed through the optical monitoring system. Preferably a respective fiber bundle for illuminating the isolating switch or switches and a fiber bundle is to guide an optical image of the isolating switch or switches to the observation module.

It is preferred that the observation module is disposed at the front of the installation housing, in particular physically close to one or more operating units of the switchgear such as, for example, operating units for isolating switches and/or multi-position switches.

It is also preferred that the switchgear is a medium-voltage switchgear or high-voltage switchgear, wherein medium voltage refers in particular to voltages of 1000 V and more, and high voltage refers to voltages of more than 52 kV.

It is further preferred that the gas-insulated switchgear contains a fluoroketone and/or fluoronitrile and/or olefin, in particular a hydrofluoroolefin, and/or nitrogen and/or $CO_2$ as insulating gas and/or switching gas.

It is also preferred that the observation module protrudes out of the installation housing through an opening and is thus removable, or is visible from outside the installation housing through a further transparent window and can be removed after opening the installation housing. The image of the isolating switch or switches can thus be seen directly or indirectly from outside the installation housing through the further transparent window.

It is further preferred that the observation module is held in the installation housing through latching, screwing and/or magnetically.

It is also preferred that in the region of the first transparent window, the fiber-optic system has:
imaging optics, or
imaging optics with a wide-angle objective lens, or
imaging optics with the imaging properties of a wide-angle objective lens, through which an image of the at least one isolating switch can be captured, i.e. is observable, with the second end of the first fiber bundle, and that, in a special implementation, the imaging optics optionally project light out of the second fiber bundle into the region of the at least one isolating switch; alternatively the second fiber bundle can also be disposed so as to surround the imaging optics.

In particular, the construction of the imaging optics as a wide-angle objective lens is preferred.

It is further preferred that the imaging optics are implemented in a module, and the module is disposed removably in the installation housing. Such a further modular configuration enables a simplified maintenance and a simplified exchange of faulty components of the optical monitoring system.

It is also preferred that, in addition to the light source, light from an external illumination source can be coupled into the third end of the second fiber bundle by using a light-coupling device. Both a light source operating facility and a light-coupling device are then preferably present at the observation module.

It is also preferred that the light source in the observation module can be supplied with electricity from outside the installation housing. The light source is thus disposed in the observation module, and the light source can be supplied with electrical current, voltage and/or energy from the observation module, i.e. in particular also from outside the installation housing. It is, in particular, preferred that electronics in the observation module recognize whether an external current source and/or voltage source is connected to the light source, and the external current source and/or voltage source is then automatically used to supply the light source, or the external current source and/or voltage source is only used to supply the light source when an internal current source and/or voltage source is not available to supply the light source and/or does not make sufficient current and/or voltage available. For this purpose a light source operating facility and/or an electrical interface and/or an optical interface such as a light-coupling device is preferably present at the observation module. It is, in particular, also preferred if an internal light source with internal electrical supply, for example a battery or accumulator, an internal light source with an external electrical supply, or an external light source can serve as the light source, i.e. all three alternatives are simultaneously available. Such a configuration in principle further increases the security against failure of such an optical monitoring system.

It is also preferred that the light source in the observation module can be supplied with current by using an internal energy source, a battery or accumulator, and can additionally be supplied with electricity from outside the installation housing.

In particular it is preferred that the internal energy source in the observation module is exchangeable, in particular that the internal energy source is disposed behind the light source operating facility, and the light source operating facility is removable and that the internal energy source is thus accessible and in particular exchangeable. In particular it is also preferred that the light source operating facility can be unscrewed from the observation module together with the internal energy source.

It is further preferred that the at least one isolating switch is at least a three-position switch, and all three positions, i.e. switching positions, of the at least one three-position switch can be captured as an image through the first transparent window and the optical picture can be transmitted to the observation module disposed at the first end at the installation housing.

In particular it is preferred that the switchgear is a three-phase switchgear with three or six three-position switches, and all three switching positions of the three or six three-position switches, i.e. nine or eighteen switching positions, can be captured as an image through the first transparent window and the optical picture can be transmitted to the observation module disposed at the first end at the installation housing.

It is also preferred that the imaging system of the observation module includes an eyepiece that optically enables the observation of the picture from the encapsulated housing, in particular that the eyepiece represents an image with a size of a few millimeters from the encapsulated housing in enlarged form, in particular enlarged by a factor of five or ten or fifteen or twenty or twenty five or thirty, with a magnification by a factor of twenty to thirty being particularly preferred.

It is also preferred that one or a plurality of reference markings are disposed in the observation module which mark at least one position of the at least one isolating switch or of the at least one three-position switch. These reference markings thus help the identification of the switch position that is present; in particular these are disposed in such a way that the reference markings, when observed through the observation module, each lie optically parallel to one of the possible switch positions.

In particular it is preferred that a respective reference marking is present for each position of one of these isolating switches or three-position switches, in particular that identical switching positions at each isolating switch or three-position switch are marked in the same manner, for example with the same color and/or the same symbol.

It is also preferred that one or a plurality of reference markings are disposed in the imaging optics which mark at least one position of the at least one isolating switch or of the at least one three-position switch. These reference markings thus help the identification of the switch position that is present; in particular these are disposed in such a way that the reference markings, when observed through the observation module, each lie optically parallel to one of the possible switch positions.

In particular it is preferred that a respective reference marking is present for each position of one of these isolating switches or three-position switches, in particular that identical switching positions at each isolating switch or three-position switch are marked in the same manner, for example with the same color and/or the same symbol.

It is also preferred that the first fiber bundle is formed with two or more fibers, and the second fiber bundle is formed with one or more fibers.

It is further preferred that the first fiber bundle is formed with a thousand or more fibers.

It is also preferred that the second fiber bundle is formed with up to sixteen fibers, particularly preferred with up to 4 fibers. The second fiber bundle can, in particular, both be routed as a bundle or, alternatively, the fibers can be routed individually.

In particular it is preferred that the second fiber bundle is split or divided at its third end through to its fourth end into individual fibers, and the individual fibers of the second fiber bundle are disposed as a ring, i.e. as a conceptual ring, around the first fiber bundle. This enables an even and/or adequate and/or emphasized illumination of the isolating switch or switches or three-position switches.

In particular it is also preferred that the second fiber bundle is split at its fourth end into individual fibers, and the individual fibers of the second fiber bundle are distributed like a ring, but not evenly around the ring, that is the conceptual ring, disposed around the first fiber bundle and/or the imaging optics. In this way it is ensured that more remote regions in the encapsulated housing are also illuminated evenly and/or with emphasis, i.e. that the relevant regions with the isolating switch or switches or three-position switches are illuminated evenly and/or with emphasis.

It is also preferred that the first fiber bundle and the second fiber bundle include a protective cladding, in particular a common protective cladding in those regions in which they are routed parallel or together.

It is also preferred that a coupling module with a fixed coupling module part and a mobile coupling module part is disposed between:

the observation module on one hand and the first end of the first fiber bundle and the third end of the second fiber bundle on the other hand, or can be so disposed.

It is, in particular, preferred that the mobile coupling module part is disposed fixed to the observation module, and the fixed coupling module part is disposed fixed in a receptacle in the installation housing.

Other features which are considered as characteristic for the invention are set forth in the appended claims.

Although the invention is illustrated and described herein as embodied in a switchgear with a modular optical monitoring system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 is a fragmentary sectional view of switchgear according to the invention with a partially removed observation module.

DETAILED DESCRIPTION OF THE INVENTION

Figure 1:
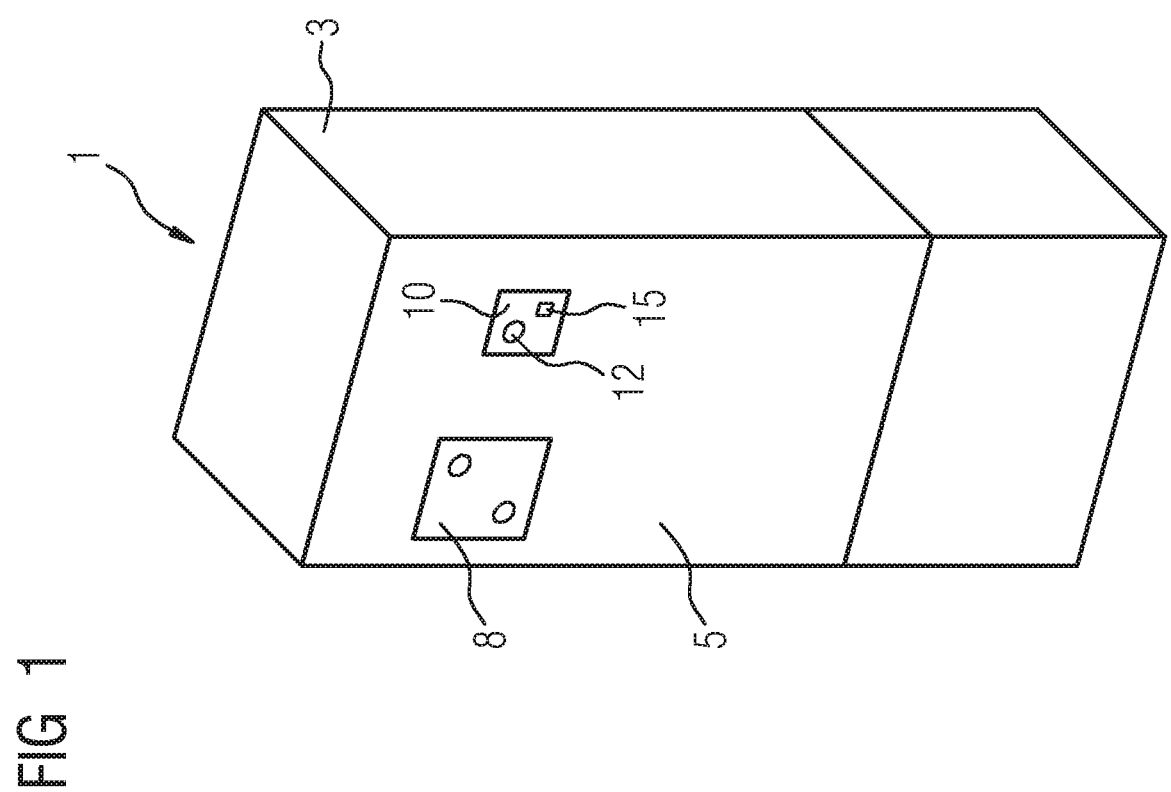
FIG. 1 is a diagrammatic, perspective view of switchgear according to the invention.

Referring now to the figures of the drawings in detail and first, particularly, to FIG. 1 thereof, there is seen a switchgear 1 according to the invention with an installation housing 3. An operating unit 8 is disposed in an installation housing front 5 of the installation housing 3. The installation housing front 5 also includes an observation module 10 and a light source operating facility 15 and/or an in principle optional light-coupling device 15.

Figure 2:
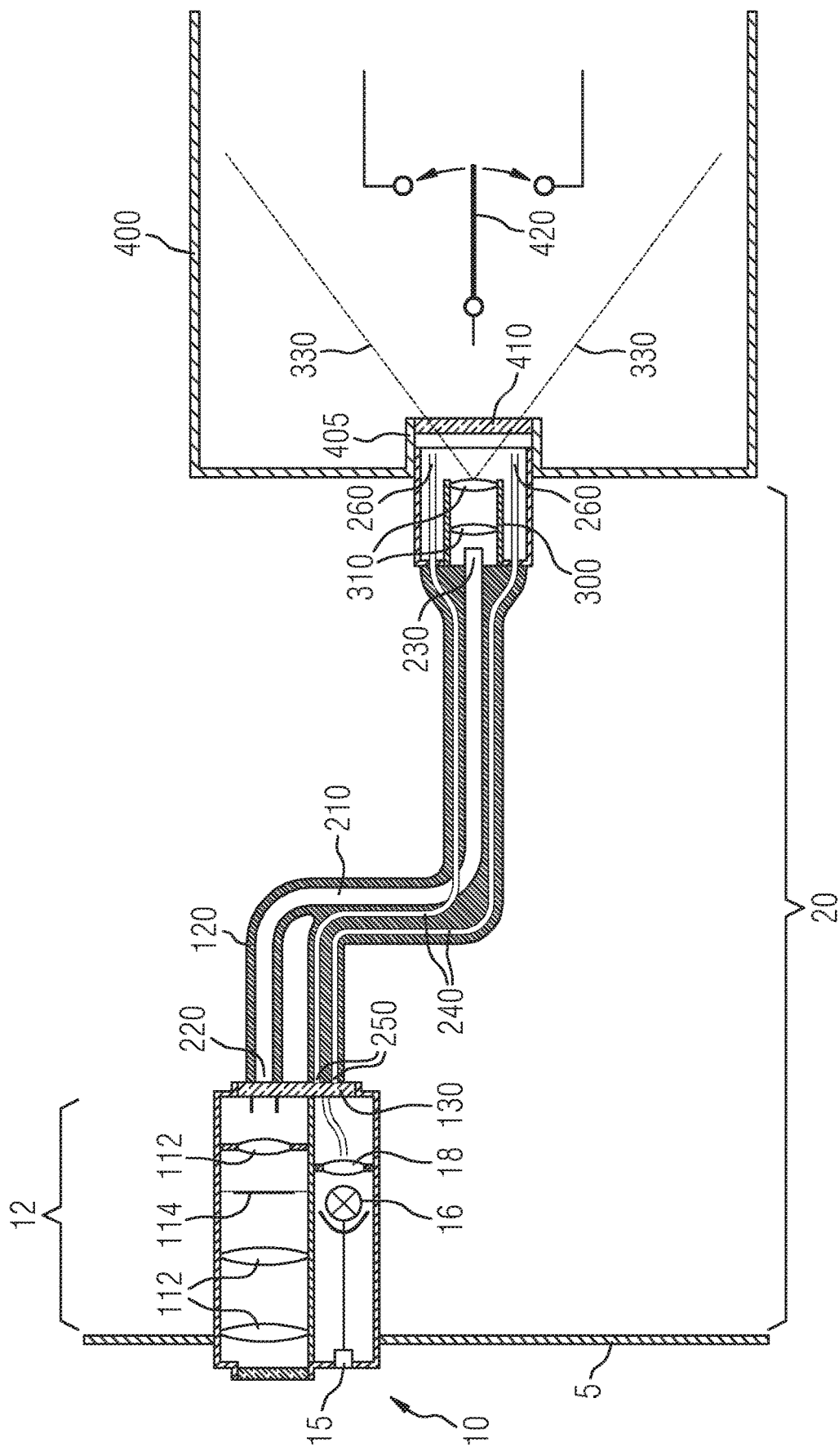
FIG. 2 is an enlarged, fragmentary, sectional view of switchgear according to the invention with a removable observation module.

FIG. 2 shows a diagrammatic illustration of a section of the switchgear 1 according to the invention having an optical monitoring system 20 for examining switchgear switching positions. The observation module 10 is routed through the installation housing front 5. The observation module 10 in this case includes, by way of example, an imaging system 12 of three lenses 112 to form an eyepiece and an optional reference marking 114. In principle, however, an eyepiece that is formed of one lens is also adequate. The reference marking 114 is applied to a transparent carrier that is fixed inside the observation module 10. The observation module 10 further includes a light source 16. The observation module in this case is implemented as a push-in observation module 10. A screw-in observation system is also possible as an alternative. The push-in observation module 10, or the screw-in observation module 10, can preferably only be pushed or screwed into a predetermined position by using non-illustrated guide elements, so that an incorrect alignment of the observation system is avoidable. It is preferred that the observation module 10 is held or fixed in the desired position by magnets, which are not shown herein. A first end 220 of a first fiber bundle 210 is connected through a coupling module 130 to the observation module 10. The first fiber bundle 210 is routed inside a protective cladding 120 to imaging optics 300. The imaging optics 300 include, in this example, two lenses 310 of the imaging optics 300. In principle, one lens can also be adequate, or a plurality of lenses can be necessary. The imaging optics 300 furthermore adjoin a first transparent window 410. The first transparent window 410 in this case is installed in an encapsulated housing 400 of the switchgear 1 by using a flange 405. An isolating switch, in this case, more precisely, a three-position switch 420, is disposed in a field of view 330 in the encapsulated housing 400 of the switchgear 1.

A light source operating facility and/or light-coupling device and/or electrical interface 15 in this case is disposed at the observation module 10. The light-coupling device 15 in this case additionally includes an inward light-coupling element 18, in this case a lens, alternatively a lens system, which both couples light of the light source 16 within the observation module 10 as well as light of an external light source through the light-coupling device into the coupling module 130.

The light source 16 in the observation module 10 can, alternatively or optionally, that is to say additionally, have an electrical interface 15 for the external electrical supply of the light source 16 at the observation module.

A second fiber bundle 240 has a third end 250 and a fourth end 260. The second fiber bundle 240 begins with the third end 250 and runs from the coupling module 130 to the fourth end 260 in the imaging optics 300. The second fiber bundle 240 is led between the coupling module 130 and the imaging optics 300 within the protective cladding 120. Additionally, not shown herein, the individual fibers of the second fiber bundle 240 inside the imaging optics 300 can also be led in a protective cladding 120.

In the preferred embodiment shown herein, the first fiber bundle 210 and the second fiber bundle 240 are disposed in the common protective cladding 120 in the region in which they are brought together.

In the example illustrated, the imaging optics 300 include the two lenses 310 of the imaging optics 300, in order to couple an image of the interior of the encapsulated housing 400 with the three-position switch 420 into the first fiber bundle 210. In principle, one lens can also be adequate, or a plurality of lenses can be necessary.

In order to achieve an optimized illumination of the three-position switch 420, in the exemplary embodiment illustrated, the fibers of the second fiber bundle 240 at the fourth end 260 of the second fiber bundle 240 are led to the end of the imaging optics 300 that adjoin the first transparent window 410. The fibers of the second fiber bundle 240 are disposed in this case in a preferred embodiment in the form of a ring around the lenses 310 of the imaging optics 300, or are disposed around them in smaller bundles.

This preferred embodiment furthermore has a shape of the flange 405 or the window flange 405 of the encapsulated housing 400 which corresponds to the external form of the imaging optics 300, so that in particular in the case of a modular construction of the imaging optics 300, it is ensured that the imaging optics 300 are disposed in a predefined position in the flange 405 or the window flange 405 of the encapsulated housing 400, and that a correct observation of the three-position switch or switches 420 is thus enabled, and that the reference marking 114 also shows the correct positions. This can in particular furthermore preferably be achieved in that the imaging optics 300 can only be inserted into the flange 405 or window flange 405 of the encapsulated housing 400 in a predefined alignment and will be or are latched there.

FIG. 3 shows a diagrammatic illustration of a section of a switchgear 1 according to the invention with a partially removed observation module 10. The observation module 10 of FIG. 3 is partially removed from the receptacle 6 in the installation housing front 5. The receptacle 6 can, alternatively, also be disposed at other parts of the installation housing 3, for example at the installation housing lid or an installation housing side.

In the illustrated example, the observation module 10 is movable parallel to a direction of movement 11, i.e. it can be pushed in or pulled out. Alternatively, and not shown, the observation module 10 can also be constructed in such a way that it can be screwed in and screwed out.

In the position illustrated with the partially removed observation module 10, it can be recognized that the coupling module, in this case 130, is formed of a mobile coupling module part 138 that is connected, in particular permanently connected, to the observation module 10, and a fixed coupling module part 135 that is permanently disposed in the receptacle 6.

The mobile coupling module part 138 at the observation module 10 preferably includes an outward coupling module 131 for outward coupling of the image of the isolating switch or switches or three-position switches 420 out of the first end 220 of the first fiber bundle 210, see FIG. 2, and an inward coupling module 132 for coupling light into the third end 250 of the second fiber bundle 240.

The observation module 10 in this case includes, by way of example, an imaging system 12 of three lenses 112 to form an eyepiece and an optional reference marking 114. The reference marking 114 is applied to a transparent carrier that is fixed inside the observation module 10. The observation module 10 further includes a light source 16.

A light source operating facility and/or light-coupling device and/or electrical interface 15 in this case is disposed at the observation module 10. The light-coupling device 15 in this case additionally includes an inward light-coupling element 18, in this case a lens, alternatively a lens system, which both couples light of a light source 16 within the observation module 10 as well as light of an external light source through the light-coupling device 15 into the mobile coupling module part 138 of the coupling module 130.

The light source 16 in the observation module 10 can, alternatively or optionally, that is to say additionally, have an electrical interface 15 for the external electrical supply of the light source 16 at the observation module. In the event of the presence of all three operating options, internal light source 16, external light source and electrical supply of the light source 16 through an electrical interface 15, a light source operating facility and a light-coupling device and an electrical interface 15 are located at the observation module. In one preferred embodiment, the lenses 112 of the imaging system 12 are protected by a transparent disk. It is further preferred that the interior of the observation module 10, as shown in FIGS. 2 and 3, is divided into two lightproof regions, one for accommodating the light source 16 and one for accommodating the imaging system 12.

LIST OF REFERENCE SIGNS

1 Switchgear;
3 Installation housing;
5 Installation housing front;
6 Receptacle in the installation housing front 5;
8 Operating unit;
10 Observation module;
11 Direction of movement of the observation module 10;
12 Imaging system;
15 Light source operating facility and/or light-coupling device;
16 Light source, for example LED or incandescent bulb;
18 Inward light-coupling element, for example an optical lens;
20 Optical monitoring system;
112 Lenses of the imaging system 12 of the observation module 10;
114 Reference markings, in particular on a transparent carrier;
120 Protective cladding;
130 Coupling module;
131 Outward coupling module of the mobile coupling module part 138;
132 Inward coupling module of the mobile coupling module part 138;
135 Fixed coupling module part;
138 Mobile coupling module part;
210 First fiber bundle;
220 First end of the first fiber bundle 210;
230 Second end of the first fiber bundle 210;
240 Second fiber bundle;
250 Third end of the second fiber bundle 240;
260 Fourth end of the second fiber bundle 240;
300 Imaging optics;
310 Lenses of the imaging optics 300;
330 Field of view through the first transparent window 410 into the encapsulated housing 400 of the switchgear 1;
400 Encapsulated housing of the switchgear 1;
405 Flange or window flange of the encapsulated housing 400;

410 First transparent window in the flange or window flange 405;
420 Isolating switch or three-position switch in the encapsulated housing 400.

The invention claimed is:

1. A switchgear, comprising:
an optical monitoring system without cameras for examining switchgear switching positions;
an installation housing;
a receptacle disposed in said installation housing:
an encapsulated housing disposed in said installation housing, said encapsulated housing having a region with a first transparent window;
at least one isolating switch accommodated in said encapsulated housing;
an observation module disposed removably at or in said installation housing;
an imaging system disposed in said observation module at or in said installation housing;
a fiber-optic system leading from an outer side of said installation housing to said first transparent window;
said fiber-optic system including at least one first fiber bundle having a first end and a second end for capturing an optical picture of said at least one isolating switch through said first transparent window and transmitting the optical picture to said observation module disposed at said first end with said imaging system;
said fiber-optic system including at least one second fiber bundle having a third end and a fourth end;
a light source disposed in said observation module, said light source emitting light to be guided from said third end to said fourth end in a region of said first transparent window and to be guided through said first transparent window; and
a coupling module with a fixed coupling module part and a mobile coupling module part, said mobile coupling module part being fixed to said observation module, said fixed coupling module part being installed in said installation housing and fixed in said receptacle in said installation housing;
said coupling module being disposed or configured to be disposed between said observation module on one side and both said first end of said first fiber bundle and said third end of said second fiber bundle on another side.

2. The switchgear according to claim 1, wherein said observation module protrudes out of said installation housing through an opening and said observation module is removable.

3. The switchgear according to claim 1, which further comprises a further transparent window, said observation module being visible from outside said installation housing through said further transparent window and said observation module being removable after opening said installation housing.

4. The switchgear according to claim 1, wherein said fiber-optic system has, in said region with said first transparent window:
imaging optics, or
imaging optics with a wide-angle objective lens, or
imaging optics with imaging properties of a wide-angle objective lens,
through which an image of said at least one isolating switch can be captured with said second end of said first fiber bundle.

5. The switchgear according to claim 4, wherein said imaging optics are implemented in a module, and said module is removably disposed in said installation housing.

6. The switchgear according to claim 4, which further comprises one or a plurality of reference markings disposed in said imaging optics for marking at least one position of said at least one isolating switch.

7. The switchgear according to claim 4, wherein:
said at least one isolating switch is at least one three-position switch;
all three switching positions of said at least one three-position switch are configured to be captured as an image through said first transparent window for transmitting the optical picture to said observation module disposed at said first end of said at least one first fiber bundle at said installation housing; and
one or a plurality of reference markings are disposed in said imaging optics for marking at least one position of said at least one three-position switch.

8. The switchgear according to claim 4, wherein:
the switchgear is a three-phase switchgear;
said at least one isolating switch is three or six three-position switches;
all three switching positions of said three or six three-position switches are configured to be captured as an image through said first transparent window for transmitting the optical picture to said observation module disposed at said first end of said at least one first fiber bundle at said installation housing; and
one or a plurality of reference markings are disposed in said imaging optics for marking at least one position of said three or six three-position switches.

9. The switchgear according to claim 1, which further comprises a light-coupling device for coupling light from an external illumination source into said third end of said second fiber bundle, in addition to the light from said light source.

10. The switchgear according to claim 1, wherein said light source in said observation module is configured to be supplied with electricity from outside said installation housing.

11. The switchgear according to claim 10, wherein:
the switchgear is a three-phase switchgear;
said at least one isolating switch is three or six three-position switches; and
all three switching positions of said three or six three-position switches are configured to be captured as an image through said first transparent window for transmitting the optical picture to said observation module disposed at said first end of said at least one first fiber bundle at said installation housing.

12. The switchgear according to claim 11, which further comprises one or a plurality of reference markings disposed in said observation module for marking at least one position of said three or six three-position switches.

13. The switchgear according to claim 1, wherein:
said at least one isolating switch is at least one three-position switch; and
all three switching positions of said at least one three-position switch are configured to be captured as an image through said first transparent window for transmitting the optical picture to said observation module disposed at said first end of said at least one first fiber bundle at said installation housing.

14. The switchgear according to claim 13, which further comprises one or a plurality of reference markings disposed in said observation module for marking at least one position of said at least one three-position switch.

15. The switchgear according to claim 1, wherein said imaging system of said observation module includes an eyepiece optically enabling an observation of the picture from said encapsulated housing.

16. The switchgear according to claim 1, which further comprises one or a plurality of reference markings disposed in said observation module for marking at least one position of said at least one isolating switch.

17. The switchgear according to claim 1, wherein said first fiber bundle is formed with two or more fibers, and said second fiber bundle is formed with one or more fibers.

18. The switchgear according to claim 17, wherein said first fiber bundle is formed with one thousand or more fibers.

19. The switchgear according to claim 17, wherein said second fiber bundle is formed with up to four or up to sixteen fibers.

* * * * *